United States Patent
Jan et al.

(10) Patent No.: US 8,804,964 B2
(45) Date of Patent: Aug. 12, 2014

(54) ACCESS CONTROL METHOD AND RELATED WIRELESS COMMUNICATION SYSTEM

(75) Inventors: Cheng-Shiun Jan, Taoyuan County (TW); Yi-Chi Lin, Taoyuan County (TW); Zih-Ci Lin, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/526,471

(22) Filed: Jun. 18, 2012

(65) Prior Publication Data

US 2013/0336487 A1 Dec. 19, 2013

(51) Int. Cl.
*H04L 29/06* (2006.01)

(52) U.S. Cl.
USPC ........... 380/278; 370/310; 370/328; 370/338; 370/349; 455/426.2; 455/422.1; 455/411; 455/41.2; 455/419; 455/414.1; 726/29; 705/57; 705/72; 709/220

(58) Field of Classification Search
USPC .............. 370/310, 328, 338, 349; 455/426.1, 455/426.2, 422.1, 411, 41.2, 419, 414.1, 455/41.1; 726/29; 705/57, 72; 709/220
See application file for complete search history.

(56) References Cited

U.S. PATENT DOCUMENTS

| | | | |
|---|---|---|---|
| 7,974,606 B2 * | 7/2011 | Lo et al. | 455/411 |
| 2006/0251256 A1 * | 11/2006 | Asokan et al. | 380/270 |
| 2010/0048173 A1 * | 2/2010 | Ross et al. | 455/411 |
| 2011/0205944 A1 * | 8/2011 | Miyabayashi et al. | 370/310 |
| 2012/0069772 A1 * | 3/2012 | Byrne et al. | 370/255 |
| 2012/0220224 A1 * | 8/2012 | Walker | 455/41.1 |
| 2012/0221695 A1 * | 8/2012 | Rose et al. | 709/223 |

* cited by examiner

*Primary Examiner* — Hadi Armouche
*Assistant Examiner* — Hee Song
(74) *Attorney, Agent, or Firm* — Winston Hsu; Scott Margo

(57) ABSTRACT

An access control method for a wireless client in a wireless communication system is disclosed. The access control method comprises receiving a distinguish signal from a wireless key distributor when the wireless client approaches the wireless key distributor; activating a application unit of the wireless client upon reception of the distinguish signal, wherein the application unit is associated with the distinguish signal; sending an access information request to the wireless key distributor; receiving access information from the wireless key distributor; configuring the wireless client with the access information; and using the access information to access a wireless access appoint.

23 Claims, 5 Drawing Sheets

ACCESS CONTROL METHOD AND RELATED WIRELESS COMMUNICATION SYSTEM

BACKGROUND OF THE INVENTION

1. Field of the Invention

The present invention relates to a method used in a wireless communication system, and more particularly, to an access control method in a wireless communication system to enable a wireless access point to dynamically grant access permission to a wireless client.

2. Description of the Prior Art

A wireless access point offers wireless connection services for a wireless device to connect to wired networks and or the other wireless devices, using WiFi, Bluetooth, or other standards. The wireless access point may apply security mechanisms, such as Wired Equivalent Privacy (WEP), Wi-Fi Protected Access (WPA) or WPA2, to protect the network from information leakage and unauthorized access. When these security mechanisms are enabled, the clients will need to obtain a pre-shared key (PSK) or certificate before being able to access the wireless network.

While WEP and WPA-PSK can provide protection to a certain level, they are still subject to the dictionary attacks or brute force attacks. Using cracking tools, like aircrack-ng, it is possible for one to crack a weak key in several minutes. A good practice for network administrators to block these kind of attacks is to use strong keys, for example, a 13-character-long truly random key, and change it every so often. However, changing keys for wireless network is troublesome for network administrators, for example, they will need to distribute the new keys to the users and the users need to re-entered the keys to the clients' wireless configuration UI (user interface). So many administrators tend not to change the keys very often, and even worse some may use same keys for different wireless networks. As a result, their wireless networks become prone to hackers' attacks and or unauthorized accesses.

SUMMARY OF THE INVENTION

The disclosure therefore provides an access control method for a wireless client in a wireless communication system.

An access control method for a wireless client in a wireless communication system is disclosed. The access control method comprises receiving a distinguish signal from a wireless key distributor when the wireless client approaches the wireless key distributor; activating a application unit of the wireless client upon reception of the distinguish signal, wherein the application unit is associated with the distinguish signal; sending an access information request to the wireless key distributor; receiving access information from the wireless key distributor; configuring the wireless client with the access information; and using the access information to access a wireless access appoint.

An access control method for a wireless key distributor in a wireless communication system is disclosed. The access control method comprises activating a application unit of the wireless key distributor; sending a distinguish signal to a wireless client when the wireless client approaches the wireless key distributor, wherein the distinguish signal is associated with the application unit; receiving an access information request from the wireless client; querying access information from a data storage of the wireless key distributor; and sending the access information to the wireless client.

A wireless client comprises an application unit for executing access control; an NFC module for receiving a distinguish signal from a wireless key distributor when the wireless client approaches the wireless key distributor; and a processing module coupled to the NFC module for activating the application unit of the wireless client upon reception of the distinguish signal, wherein the distinguish signal is associated with the application unit.

A wireless key distributor comprises an application unit for executing access control; a processing module coupled to the application unit for activating the application unit; and an NFC module for sending a distinguish signal to a wireless client when the wireless client approaches the wireless key distributor, wherein the distinguish signal is associated with the application unit.

A wireless communication system comprises at least one wireless client, at least one wireless distributor and a wireless access point (AP). The at least one wireless client comprises a first application unit for executing access control; a first NFC module for receiving a distinguish signal; and a first processing module coupled to the first NFC module for activating the first application unit upon reception of the distinguish signal. The at least one wireless distributor comprises a second application unit for executing access control; a second processing module coupled to the second application unit for activating the second application unit; and a second NFC module for sending the distinguish signal to the first NFC module when the wireless client approaches the wireless key distributor. The wireless AP is coupled to the first wireless distributor for proving the at least one wireless client connection services; wherein, the distinguish signal is associated with the first application unit and the second application unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
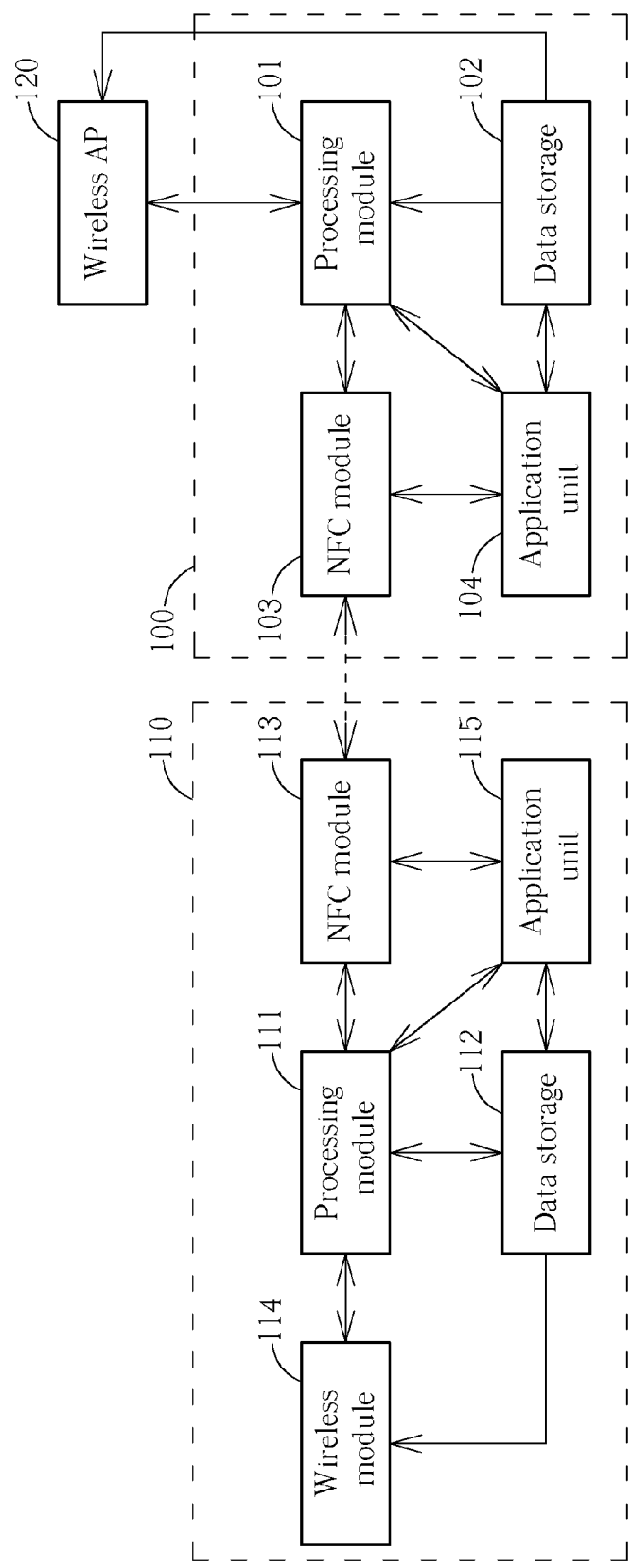
FIG. 1 is a schematic diagram of a wireless communication system.

Please refer to FIG. 1, which is a schematic diagram of a wireless communication system 10. The wireless communication system 10 could comply with Wi-Fi, Bluetooth, or other standards. The wireless communication system 10 includes a wireless client 110, a wireless key distributor 100 and a wireless access point (AP) 120. The wireless client 110 can be a personal digital assistant (PDA), laptop, mobile phone, global positioning system (GPS), MP3 player, and not limited thereby. The wireless client 110 communicates with the wireless key distributor 100 via a short range communication, such as near field communication (NFC) standard. The NFC standards cover communications protocols and data exchange formats, and are based on existing radio-frequency identification (RFID) standards. The wireless key distributor 100 is used for sending access information, e.g. service set identifier (SSID) and pre-shard key (PSK), to the wireless client 110. The wireless client 110 then uses the received access information to access the wireless AP 120. The wireless AP 120 and the wireless key distributor 100 could be connected via wire or wireless connection. Preferably, the wireless AP 120 and the wireless key distributor 100 are integrated together. The wireless client 110 includes a processing module 111, a data storage 112, an NFC module 113, a wireless module 114, and an application unit 115. The wireless module 114 can comply with Wi-Fi protocol and Bluetooth protocol or any other communication protocols. The wireless key distributor 100 includes a processing module 101, a data storage 102, an NFC module 103 and an application unit 104. Preferably, the NFC module 103 and the NFC module 113 communicate via P2P mode. The application units 115 and 104 can be a software program installed in the wireless client 110 and executed by the processing module 111 and the processing module 101, respectively. Examples of the data storage 112 and the data storage 102 may be any data storage device that can store a program code of the application units 115 and 104. The data storages 102 and 112 include but are not limited to a subscriber identity module (SIM), read-only memory (ROM), random-access memory (RAM), hard disks, and optical data storage devices.

Initially, the process module 101 activates the application unit 104 when the wireless key distributor 100 is turned on. When a user holds the wireless client 110 close to the NFC module 103, the application unit 104 sends a distinguish signal to the NFC module 113 through the NFC module 103. It is possible to configure the system so that the processing module 111 will activates the application unit 115 when receives a distinguish signal. For example, if the wireless client 110 is an Android device, one may designs the application unit 115, which is an Android application in this case, so that it registers the Intent filter "android.nfc.action.NDEF_DISCOVERED" and responds when the NDEF content matches to the distinguish signal. Once activated, the application unit 115 sends an access information request to the wireless key distributor 100 via the NFC module 113 to request access information (e.g. SSID and PSK) of the wireless AP 120. The application unit 104 receives the access information request via the NFC module 103. The application unit 104 queries the access information of the wireless AP 120 from the data storage 102. The application unit 104 retrieves the access information of the wireless AP 120 and sends the access information to the wireless client 110 via the NFC module 103. The application unit 115 receives the access information via the NFC module 113 and configures the wireless client 110 with the received access information. The wireless client 110 starts to use the access information to access the wireless AP 120 when it scans and finds the SSID of the wireless AP 120 later on. Therefore, no user interference is involved according to the present disclose. An administrator is more likely to use a strong key and change the key frequently when the invented method is applied. Besides, a keys/passphrases for accessing the wireless AP 120 is no longer revealed to a user. This can reduce the possibility of the key/passphrases being leaked out.

In some examples, the wireless client 110 sends an identifier of the wireless client 110, such as the International Mobile Equipment Identity number (IMEI), an email address of a user, or a MAC address of a Wi-Fi interface, to the wireless key distributor 100 via the NFC channel. The wireless key distributor 100 stores the identifier in the data storage 102 and determines service conditions and/or QoS (Quality of Service) level based on the access information request. The wireless key distributor 100 sends the access information back to the wireless client 110 and stores the associated service conditions and/or QoS level in the data storage 102. Then, the wireless access point 120 refers to the data storage 102 to provide wireless connection services for the wireless client 110 accordingly.

Figure 2:
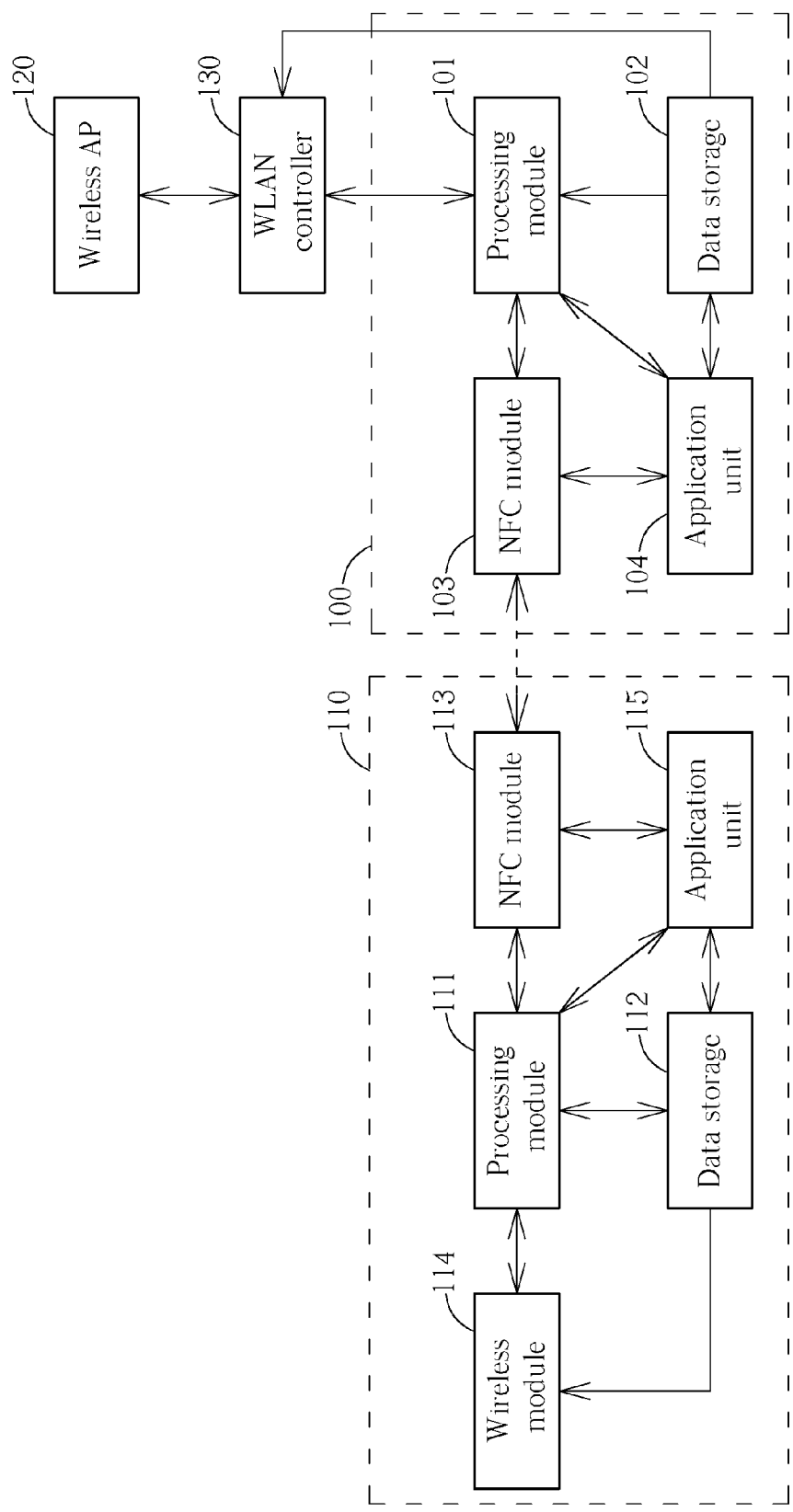
FIG. 2 is a schematic diagram of a wireless communication system.

In addition, a wireless local area network (WLAN) controller can be further included. Please refer to FIG. 2, which is a schematic diagram of a wireless communication system 20. The wireless communication system 20 has a similar structure to the wireless communication 10. Hence, the same references numbers indicate identical or functionally similar elements in FIG. 2. The detailed descriptions of the similar elements are omitted herein. The wireless communication 20 includes a wireless client 110, a wireless key distributor 100, a wireless access point (AP) 120 and a WLAN controller 130. The WLAN controller 130 is coupled to the wireless key distributor 100 and the wireless AP 120 and used for providing access authority to the wireless client according to the identifier and storing the access authority. The access authority may be referred as to service conditions, QoS level or access time limitation associated with the services provided for the wireless client 110.

When the wireless client 110 sends the identifier (e.g. IMEI, an email address, or MAC address) to the wireless key distributor 100 in the access information request, the wireless key distributor 100 forwards the identifier to the WLAN controller 130. The WLAN controller 130 determines the access authority (e.g. QoS level or access time limitation) according to the identifier. For example, the WLAN controller provides different QoS levels to the different wireless clients with different identifiers or assigns different service access time to the different wireless clients. Then, the WLAN controller 130 stores the access authority and the identifier associated with the wireless client 110 in the data storage 102. The wireless key distributor 100 sends the access information associated with the identifier to the wireless client 110. Later on, when the wireless client 110 discovers the SSID of the wireless AP 120, the wireless client 110 uses the received access information to ask for wireless service. When the wireless AP 120 receives a request for access, the wireless AP 120 looks up the access authority which should be provided for the wireless client 110 via the WLAN controller 130 and provides the corresponding connection services for the wireless client 110.

Figure 3:
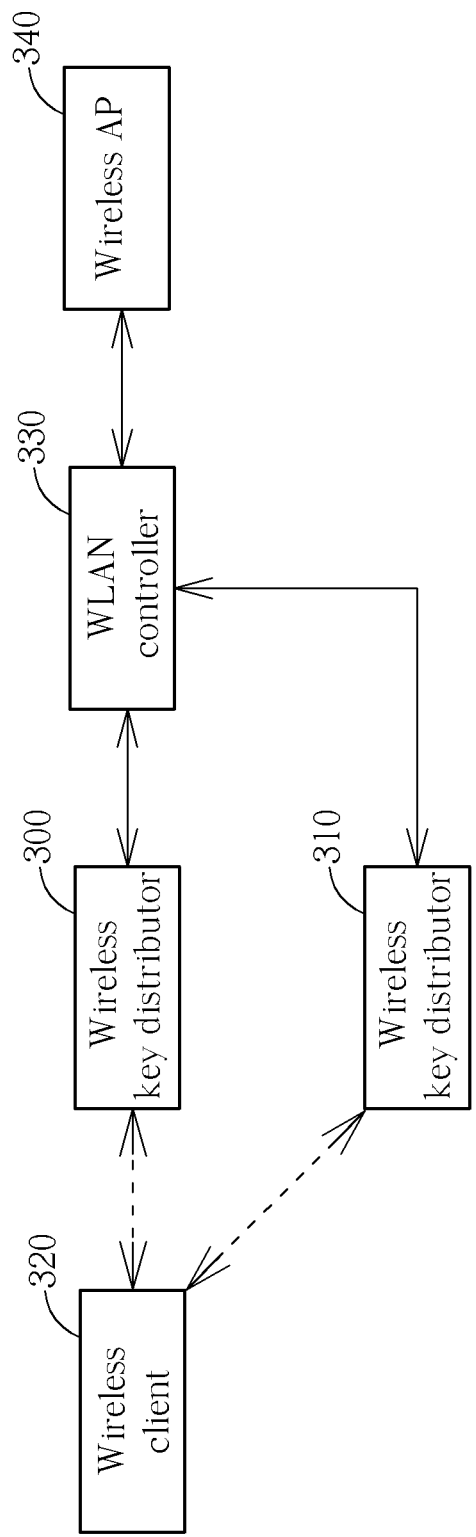
FIG. 3 is a schematic diagram of a wireless communication system.

In some examples, the WLAN controller can be connected to one or more wireless key distributors. Please refer to FIG. 3, which is a schematic diagram of a wireless communication system 30. The wireless communication system 30 includes a wireless key distributor 300, a wireless key distributor 310, a wireless client 320, a WLAN controller 330 and a wireless AP 340. The wireless key distributors 300 and 310 can be the wireless key distributor 100 shown in FIG. 1 and FIG. 2. The wireless client 320 can be the wireless client 110 shown in FIG. 1 and FIG. 2. The WLAN controller 330 can be the WLAN controller 130. The wireless AP 340 can be the wireless AP 120. The WLAN controller 330 is connected to both of the wireless key distributors 300 and 310 for providing access authority to the wireless client 320 according to the wireless key distributors 310 and 300. In other words, the WLAN controller 330 provides different access authority to the different wireless key distributors. For example, when a user holds the wireless client 320 close to the wireless key distributor 300, the WLAN controller provides a first access authority, which may have a wider bandwidth, first priority, more services, etc. When the user holds the wireless client 320 close to the wireless key distributor 310, the WLAN controller provides a limited access authority.

Figure 4:
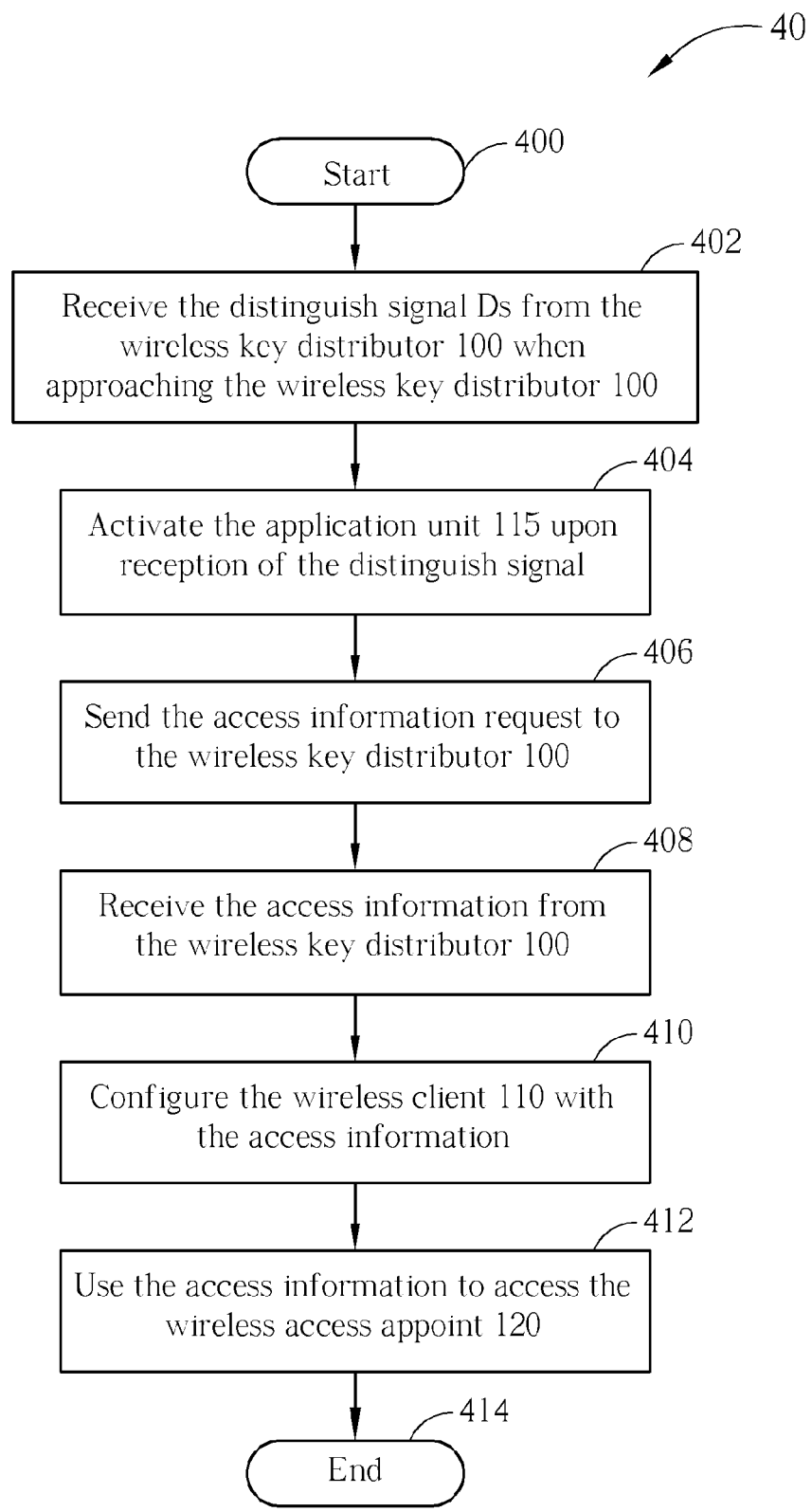
FIG. 4 is a flow chart of a process.

The operations of the wireless client 110 can be synthesized into a process. Please refer to FIG. 4, which is a flow chart of a process 40. The process 40 is used for the wireless client 110 to handle access control in a wireless communication system 10. The process 40 includes the following steps:

Step 400: Start.

Step 402: Receive the distinguish signal from the wireless key distributor 100 when approaching the wireless key distributor 100.

Step 404: Activate the application unit 115 upon reception of the distinguish signal.

Step 406: Send the access information request to the wireless key distributor 100.

Step 408: Receive the access information from the wireless key distributor 100.

Step 410: Configure the wireless client 110 with the access information.

Step 412: Use the access information to access the wireless access appoint 120.

Step 414: End.

The detailed description of the process 40 can be found above, thus is omitted herein.

Figure 5:
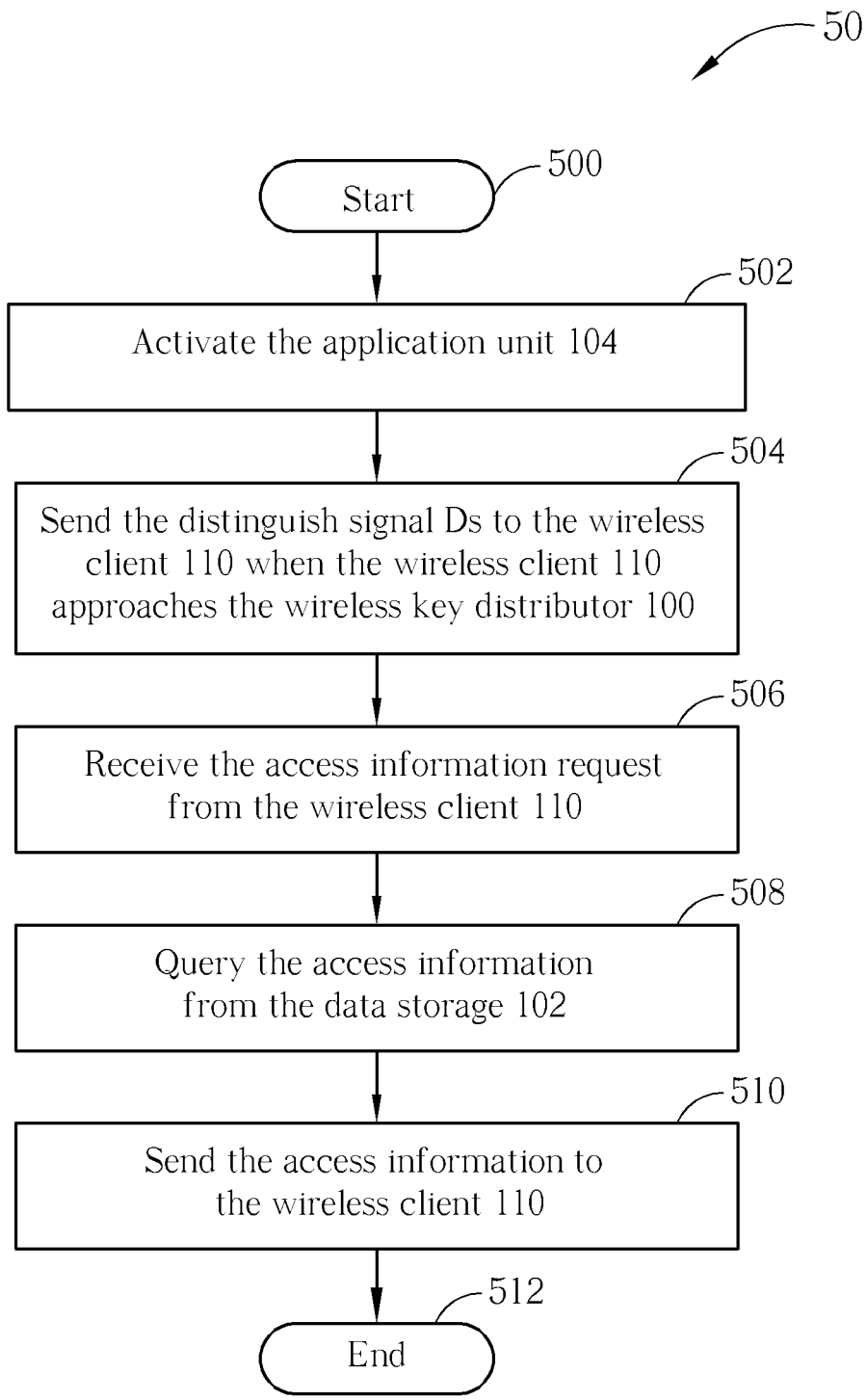
FIG. 5 is a flow chart of a process.

The operations of the wireless key distributor 100 can be synthesized into a process. Please refer to FIG. 5, which is a flow chart of a process 50. The process 50 is used for the wireless key distributor 100 to handle access control in a wireless communication system 10. The process 50 includes the following steps:

Step 500: Start.

Step 502: Activate the application unit 104.

Step 504: Send the distinguish signal to the wireless client 110 when the wireless client 110 approaches the wireless key distributor 100.

Step 506: Receive the access information request from the wireless client 110.

Step 508: Query the access information from the data storage 102.

Step 510: Send the access information to the wireless client 110.

Step 512: End.

The detailed description of the process 50 can be found above, thus is omitted herein.

To sum up, access control method of the present disclosure can mitigate the difficulties for changing the keys of the wireless network. The wireless client retrieves the SSID of the wireless access point and the PSK to access the wireless access point from the system via NFC communications. A NFC module on the wireless client configures its wireless connection using the received SSID and PSK. No user interference is involved in the present disclosure, except holding the wireless client close to the wireless key distributor at initialization. This increases the administrators' willingness to use a very strong key and change it often. In addition, the service conditions and/or the QoS level for a particular wireless client or a particular wireless key distributor can be further set by the WLAN controller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An access control method for a wireless client in a wireless communication system, the access control method comprising:

receiving a distinguish signal from a wireless key distributor via a near field communication (NFC) communications when the wireless client approaches the wireless key distributor;

activating an application unit of the wireless client upon reception of the distinguish signal, wherein the application unit is associated with the distinguish signal and the distinguish signal matches to a content of an Intent filter registered by the application unit;

sending an access information request to the wireless key distributor via a near field communication (NFC) communications;

receiving access information from the wireless key distributor via a near field communication (NFC) communications;

configuring the wireless client with the access information comprising a service set identifier and a pre-shard key; and using the access information to access a wireless access point with an access authority comprising at least one of a QoS level and an access time limitation.

2. The access control method of claim 1 further comprising sending an identifier to the wireless key distributor in the access information request.

3. The access control method of claim 1, where configuring the wireless client with the access information comprise storing the access information in a data storage of the wireless client.

4. An access control method for a wireless key distributor in a wireless communication system, the access control method comprising:

activating an application unit of the wireless key distributor;

sending a distinguish signal to a wireless client via a near field communication (NFC) communications when the wireless client approaches the wireless key distributor, wherein the distinguish signal is associated with the application unit and the distinguish signal matches to a content of an Intent filter registered by an application unit of the wireless client;

receiving an access information request from the wireless client via a near field communication (NFC) communications;

querying access information from a data storage of the wireless key distributor; and sending the access information comprising a service set identifier and a pre-shard key to the wireless client with an access authority comprising at least one of a QoS level and an access time limitation.

5. The method of claim 4 further comprising receiving an identifier in the access information request and storing the identifier in the data storage.

6. The method of claim 5, wherein querying access information from the data storage of the wireless key distributor comprises querying the access information from the data storage of the wireless key distributor according to the identifier.

7. A wireless client device comprising:

an application unit for configuring the Wi-Fi settings comprising a service set identifier and a pre-shard key, the application unit being software stored in a non-transitory storage medium to be executed by a processor;

a near field communication (NFC) circuit for receiving a distinguish signal from a wireless key distributor when the wireless client device approaches the wireless key distributor; and a processing module coupled to the NFC circuit for activating the application unit of the wireless client device upon reception of the distinguish signal, wherein the distinguish signal is associated with the application unit and the distinguish signal matches to a content of an Intent filter registered by the application unit, the processing module being software stored in the non-transitory storage medium to be executed by the processor;

wherein the wireless client device has an access authority comprising at least one of a QoS level and an access time limitation, and wherein the application unit further sends an access information request to the wireless key distributor and receives access information comprising the service set identifier and the pre-shard key from the wireless key distributor via a near field communication (NFC) communications.

8. The wireless client device of claim 7, wherein the application unit further configures the Wi-Fi settings of the wireless client device with the access information.

9. The wireless client device of claim 7, wherein the NFC circuit further sends an identifier to the wireless key distributor in the access information request.

10. The wireless client device method of claim 7 further comprising a data storage for storing the access information.

11. A wireless key distributor device comprising:
an application unit for distributing access information comprising a service set identifier and a pre-shard key, the application unit being software stored in a non-transitory storage medium to be executed by a processor, wherein the application unit further receives an access information request from the wireless client and sends access information to the wireless client via a NFC communications;
a processing module coupled to the application unit for executing the application unit, the processing module being software stored in the non-transitory storage medium to be executed by the processor; and
a near field communication (NFC) circuit for sending a distinguish signal to a wireless client when the wireless client approaches the wireless key distributor device, wherein the distinguish signal is associated with the application unit and the distinguish signal matches to a content of an Intent filter registered by an application unit of the wireless client, and the wireless client has an access authority comprising at least one of a QoS level and an access time limitation.

12. The wireless key distributor device of claim 11, wherein the application unit further receives an identifier of the wireless client in the access information request.

13. The wireless key distributor device of claim 12 further comprising a data storage for storing the identifier.

14. The wireless key distributor device of claim 13, wherein the application unit further queries access information from the data storage according to the identifier.

15. A wireless communication system comprising:
at least one wireless client comprising:
a first application unit for executing access control, the first application unit being software stored in a non-transitory storage medium to be executed by a processor;
a first near field communication (NFC) circuit for receiving a distinguish signal; and
a first processing module coupled to the first NFC circuit for activating the first application unit upon reception of the distinguish signal, the first processing module being software stored in the non-transitory storage medium to be executed by the processor;
at least one wireless key distributor comprising:
a second application unit for executing access control, the second application unit being software stored in a non-transitory storage medium to be executed by a processor;
a second processing module coupled to the second application unit for activating the second application unit, the second processing module being software stored in the non-transitory storage medium to be executed by the processor; and
a second NFC circuit for sending the distinguish signal to the first NFC circuit when the wireless client approaches the wireless key distributor;
a wireless access point (AP) coupled to the first wireless distributor for providing the at least one wireless client connection services; and
a wireless local area network (WLAN) controller coupled to the at least one wireless key distributor for providing access authority to the wireless client according to the at least one wireless key distributor and storing the access authority, wherein the access authority corresponds to the access information and comprises at least one of a QoS level and an access time limitation;
wherein, the distinguish signal is associated with the first application unit and the second application unit and the distinguish signal matches to a content of an Intent filter registered by the first application unit;
wherein the first application unit further sends an access information request to the second application unit and receives access information comprising a service set identifier and a pre-shard key from the second application unit via a near field communication (NFC) communications.

16. The wireless communication system of claim 15, wherein the first application unit further configures the Wi-Fi settings of the wireless client with the access information after receiving the access information.

17. The wireless communication system of claim 15, wherein the first application unit further sends an identifier of the wireless client to the second application unit in the access information request.

18. The wireless communication system of claim 17, wherein the second application unit receives the identifier of the wireless client in the access information request.

19. The wireless communication system of claim 17, wherein the at least one wireless client further comprises a first data storage for storing the access information and the at least one wireless key distributor further comprises a second data storage for storing the identifier.

20. The wireless communication system of claim 19, wherein the second application unit further queries the access information from the second data storage according to the identifier.

21. The wireless communication system of claim 15, wherein the wireless local area network (WLAN) controller is further coupled to the at least one wireless key distributor and the wireless AP for providing the access authority to the wireless client according to the identifier.

22. The wireless communication system of claim 21, wherein the WLAN controller provides a first access authority when receiving a first identifier and provides a second access authority when receiving a second identifier.

23. The wireless communication system of claim 15, wherein the WLAN controller provides a first access authority when the wireless client approaches a first wireless key distributor and provides a second access authority when the wireless client approaches a second wireless key distributor.

* * * * *